(12) United States Patent
Courchesne

(10) Patent No.: US 11,425,884 B2
(45) Date of Patent: Aug. 30, 2022

(54) WETTING WALL DEVICE FOR PETS

(71) Applicant: Alain Courchesne, Montreal (CA)

(72) Inventor: Alain Courchesne, Montreal (CA)

(73) Assignee: 10729752 CANADA INC. (DOGGY BATHROOM), Montréal (CA)

( * ) Notice: Subject to any disclaimer, the term of this patent is extended or adjusted under 35 U.S.C. 154(b) by 0 days.

(21) Appl. No.: 17/255,332

(22) PCT Filed: Jun. 25, 2019

(86) PCT No.: PCT/CA2019/000096
§ 371 (c)(1),
(2) Date: Jul. 19, 2021

(87) PCT Pub. No.: WO2019/241874
PCT Pub. Date: Dec. 26, 2019

(65) Prior Publication Data
US 2021/0267157 A1      Sep. 2, 2021

Related U.S. Application Data

(60) Provisional application No. 62/688,833, filed on Jun. 22, 2018.

(51) Int. Cl.
*A01K 1/01*      (2006.01)
(52) U.S. Cl.
CPC .................................. *A01K 1/0107* (2013.01)

(58) Field of Classification Search
CPC .. A01K 1/0107; A01K 1/0125; A01K 1/0157; A01K 1/0114; A01K 1/0121
See application file for complete search history.

(56) References Cited

U.S. PATENT DOCUMENTS

| | | | | |
|---|---|---|---|---|
| 4,800,677 A * | 1/1989 | Mack | ................... | A01K 1/0107 119/161 |
| 5,134,974 A * | 8/1992 | Houser | ................ | A01K 1/0125 119/168 |
| 7,610,877 B2 * | 11/2009 | Garfield | ............... | A01K 1/0107 119/170 |
| 7,677,201 B1 * | 3/2010 | Eden | .................... | A01K 1/0107 119/165 |
| 8,622,023 B1 * | 1/2014 | Tierney | ................ | A01K 1/0107 119/165 |
| 9,271,473 B2 * | 3/2016 | Ryu | ...................... | A01K 1/0152 |
| 10,791,702 B2 * | 10/2020 | Huntinghouse | ...... | A01K 1/0125 |
| 11,032,997 B2 * | 6/2021 | Martin | ................ | A01K 1/0107 |
| 2007/0113793 A1 * | 5/2007 | Kurahashi | ............ | A01K 1/0114 119/479 |
| 2010/0176144 A1 * | 7/2010 | Askinasi | ............. | A01K 1/0107 221/71 |
| 2014/0137805 A1 * | 5/2014 | Sasano | ................ | A01K 1/0152 119/161 |

* cited by examiner

*Primary Examiner* — Ebony E Evans
(74) *Attorney, Agent, or Firm* — PRAXIS

(57) ABSTRACT

A welting device for pets comprises at least one vertical wall for vertically mounting a wetting pad thereon. A wetting device for pets comprises an enclosure defining an opening for pets to enter and exit therefrom and comprising at least one vertical inner surface for vertically mounting a wetting pad thereon. The wetting pad absorbs urine discharged from a pet.

16 Claims, 13 Drawing Sheets

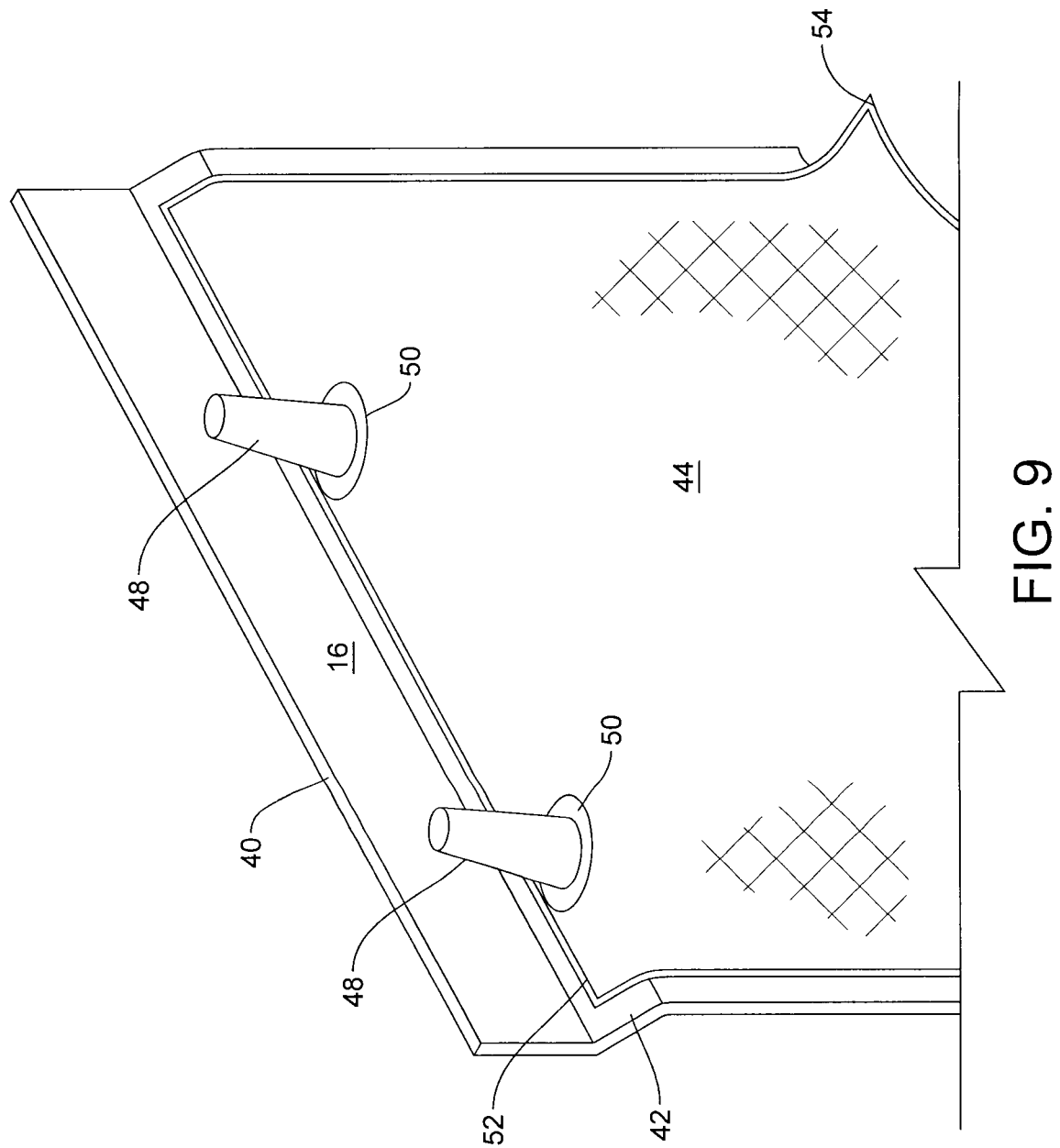

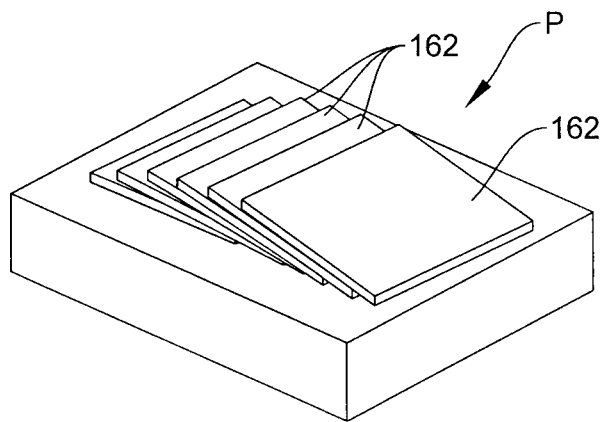
FIG. 23
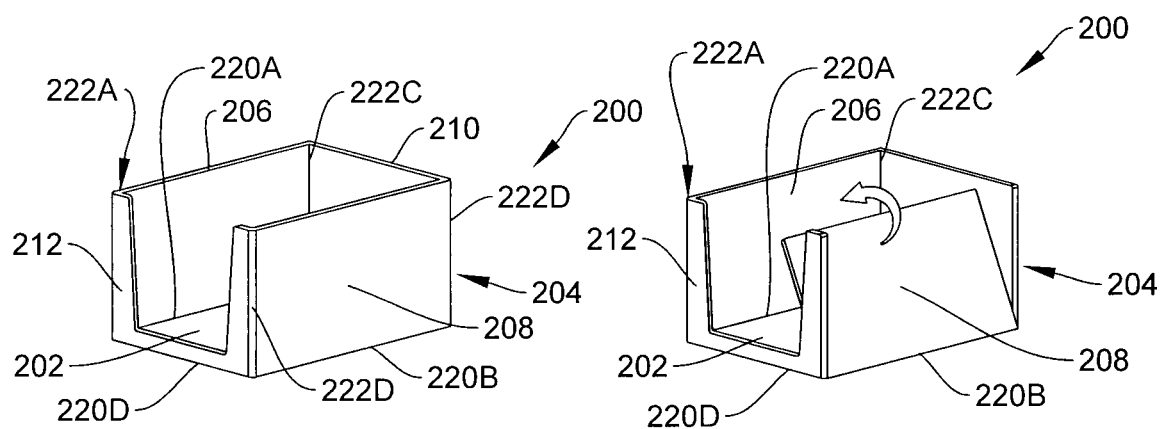
FIG. 24  FIG. 25
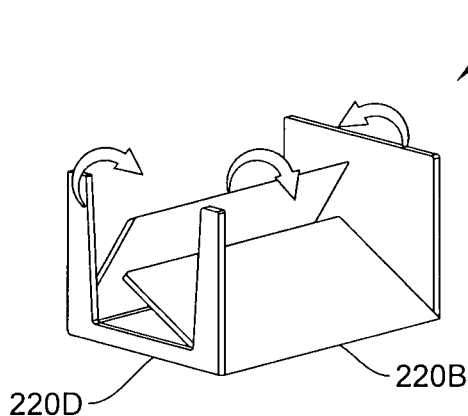 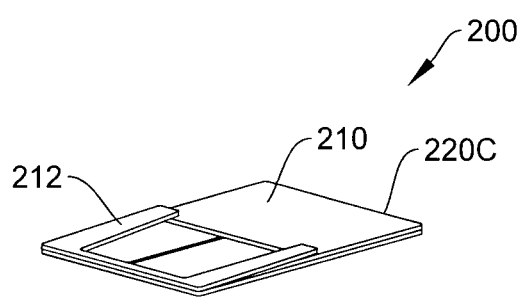
FIG. 26  FIG. 27

WETTING WALL DEVICE FOR PETS

CROSS-REFERENCE TO RELATED APPLICATIONS

The present application claims priority on U.S. Provisional Patent Application Ser. No. 62/688,833 filed on Jun. 22, 2018 and incorporated herein in its entirety.

TECHNICAL FIELD

The present disclosure generally relates to absorbent wetting pads used for pet urine and solid waste. More particularly but not exclusively, the present disclosure relates to a wetting wall device for pets.

BACKGROUND

Pets require adequate areas and facilities for waste discharge such as urine and solid waste. This is especially true for pet owners who are forced to leave their pets home for extended periods of time. In some cases, even if the owner is available, certain pets will refuse to go outdoors during very cold temperatures. Older pets may also have difficulty making it outside in time. Devices such as wetting pads and portable urination trays allowed animals to urinate indoors while attempting to avoid wetting the floor or carpet. Conventional urine entrapment devices are laid flat on the floor and the animal will squat over a selected spot on the pad or tray and discharge urine and/or solid waste. Usually male dogs as they grow out of their early puppy years do not squat when urinating but rather lift their leg and spray a vertical target. Moreover, many pets mark their territory by urinating. Both male and female dogs scent mark by urinating small amounts on vertical surfaces, usually while raising a leg. Females tend to lift their legs forward, toward their head, rather than cocking them back like males tend to. Furthermore, many dogs will tend to avoid walking on wet surfaces and owners may need to replace the pad or clean the tray before re-usage. In cases where the wet pad does not bother the animal, the pet will often get urine on its paws. In certain cases, dogs may also develop behavioral issues if they realize that they are accidentally discharging urine on the floor, or on themselves or spraying furniture or walls in the home rather than urinating on the designated pad or tray.

BACKGROUND

An object of the present disclosure is to provide a wetting wall device for pets such as dogs and more particularly but not exclusively, male dogs.

An object of the present disclosure is to provide a wetting kit for pets such as dogs and more particularly but not exclusively, male dogs.

SUMMARY

In accordance with an aspect of the present disclosure, there is provided a wetting device for pets comprising: at least one vertical wall for vertically mounting a wetting pad thereon, wherein the wetting pad absorbs urine discharged from a pet.

In an embodiment, the wetting pad is adhesively mountable to the at least one vertical wall. In an embodiment, the wetting pad comprises an adhesive substance on a rear side thereof. In an embodiment, the wetting pad comprises a removable strip of material covering the adhesive substance.

In an embodiment, the at least one vertical wall comprises a horizontal rail defining an upper surface and an opposite undersurface, the wetting pad being adhesively mountable to the either one of the upper surface and the opposite undersurface of the horizontal rail. In an embodiment, the at least one vertical wall defines apertures for stuffing for portions of the vertical wetting pad therein. In an embodiment, the at least one vertical wall comprises a roller for rollingly mounting a roll of the wetting pad thereon, a portion of the roll of the wetting pad being provided to extend along a length of the at least one vertical wall. In an embodiment, the at least one vertical wall comprises a rail and the wetting pads comprise mounting elements for being mounted on the rail, the mounting elements being selected from the group consisting of clips and snap fit elements. In an embodiment, the at least one vertical wall and the wetting pad comprise mutually engaging hook and loop elements.

In an embodiment, the wetting pad comprises a backing sheet and an absorbent layer overlaying backing sheet. In an embodiment, the backing sheet is liquid impervious. In an embodiment, the absorbent layer comprises a top sheet overlaying an absorbent core. In the embodiment, the backing sheet defines an outer side comprising an adhesive for being adhesively mounted to the at least one vertical wall.

In an embodiment, the at least one vertical wall comprises a backing sheet material mounted thereto, and the wetting pad comprises an absorbent layer extending along the backing sheet.

In an embodiment, the wetting pad comprises a plurality of pad sections thereof. In an embodiment, the pad sections are separate from each other. In an embodiment, the plurality of pad sections are connected to each other via weak tear points for selective removal thereof. In an embodiment, the device further comprises the wetting pad.

In an embodiment, the wetting pad comprises a plurality of pad sections thereof. In an embodiment, the pad sections are separate from each other. In an embodiment, the plurality of pad sections are connected to each other via weak tear points for selective removal thereof. In an embodiment, the device further comprises the wetting pad.

In an embodiment, the at least one vertical wall is upstanding from a base. In an embodiment, the at least one vertical wall defines a pair of opposite faces, either one of the opposite faces receiving the wetting pad thereon.

In accordance with an aspect of the present disclosure, there is provided a wetting device for pets comprising: an enclosure defining an opening for pets to enter and exit therefrom and comprising at least one vertical inner surface for vertically mounting a wetting pad thereon, wherein the wetting pad absorbs urine discharged from a pet.

In an embodiment, the enclosure vertically extends from a base. In an embodiment, the base is selected from the group consisting of a bottom edge of the enclosure, a bottom wall of the enclosure, a base on which the enclosure is mounted to, a tray.

In an embodiment, the wetting pad is adhesively mountable to the vertical wall. In an embodiment, the wetting pad comprises an adhesive substance on a rear side thereof. In an embodiment, the wetting pad comprises a removable strip of material covering the adhesive substance.

In an embodiment, the inner surface comprises a horizontal rail defining an upper surface and an opposite undersurface, the wetting pad being adhesively mountable to the either one of the upper surface and the opposite undersurface of the horizontal rail. In an embodiment, the inner surface defines apertures for stuffing for portions of the vertical wetting pad therein. In an embodiment, the inner surface comprises a roller for rollingly mounting a roll of the wetting pad thereon, a portion of the roll of the wetting pad being provided to extend along a length of the inner surface. In an embodiment, the inner surface comprises a rail and the wetting pads comprise mounting elements for being mounted on the rail, the mounting elements being selected from the group consisting of clips and snap fit elements. the inner surface and the wetting pad comprise mutually engaging hook and loop elements.

In an embodiment, the wetting pad comprises a backing sheet and an absorbent layer overlaying backing sheet. In an embodiment, the backing sheet is liquid impervious. In an embodiment, the absorbent layer comprises a top sheet overlaying an absorbent core. In an embodiment, the backing sheet defines an outer side comprising an adhesive for being adhesively mounted to the inner surface.

In an embodiment, the inner surface comprises a backing sheet material mounted thereto, and the wetting pad comprises an absorbent layer extending along the backing sheet. In an embodiment, the wetting pad comprises a plurality of pad sections thereof. In an embodiment, the pad sections are separate from each other. In an embodiment, the plurality of pad sections are connected to each other via weak tear points for selective removal thereof.

In an embodiment, the device further comprises the wetting pad.

In an embodiment, the enclosure comprises a plurality of walls, at least one of the plurality of walls defining the inner surface.

In an embodiment, the enclosure comprises a plurality of walls, at least one of the plurality of walls defining the inner surface, the plurality of walls being pivotably mounted to the base for being moved to a folded non-vertical position when not in use.

In accordance with an aspect of the present disclosure, there is provided a kit comprising: the device in accordance with aspects of the disclosure; and a set of instructions for training the pet to use the device.

Other objects, advantages and features of the present disclosure will become more apparent upon reading of the following non-restrictive description of illustrative embodiments thereof, given by way of example only with reference to the accompanying drawings.

BRIEF DESCRIPTION OF THE DRAWINGS

In the appended drawings:

FIG. 9 is a perspective view of an internal panel and wetting pad of the wetting device in accordance with a non-restrictive illustrative embodiment of the present disclosure;

FIG. 23 is a perspective view of a plurality of wetting pads in accordance with a non-limiting illustrative embodiment of the present disclosure;

FIG. 24 is a perspective view of a wetting wall device in accordance with a non-restrictive illustrative embodiment of the present disclosure;

FIG. 25 is a perspective view of the wetting wall device of FIG. 24 shown with one wall thereof being moved to a folded position;

FIG. 26 is a perspective view of the wetting wall device of FIG. 24 shown with the walls thereof being moved to a folded position;

FIG. 27 is a perspective view of the wetting wall device of FIG. 24 in the folded position;

DETAILED DESCRIPTION OF ILLUSTRATIVE EMBODIMENTS

Figure 1:
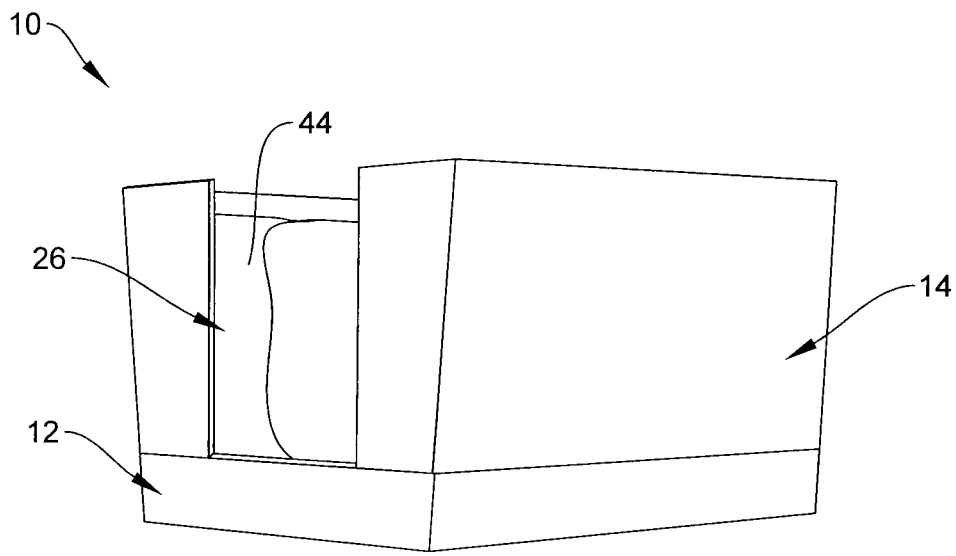
FIG. 1 a perspective view of the wetting wall device in accordance with a non-restrictive illustrative embodiment of the present disclosure.
Figure 2:
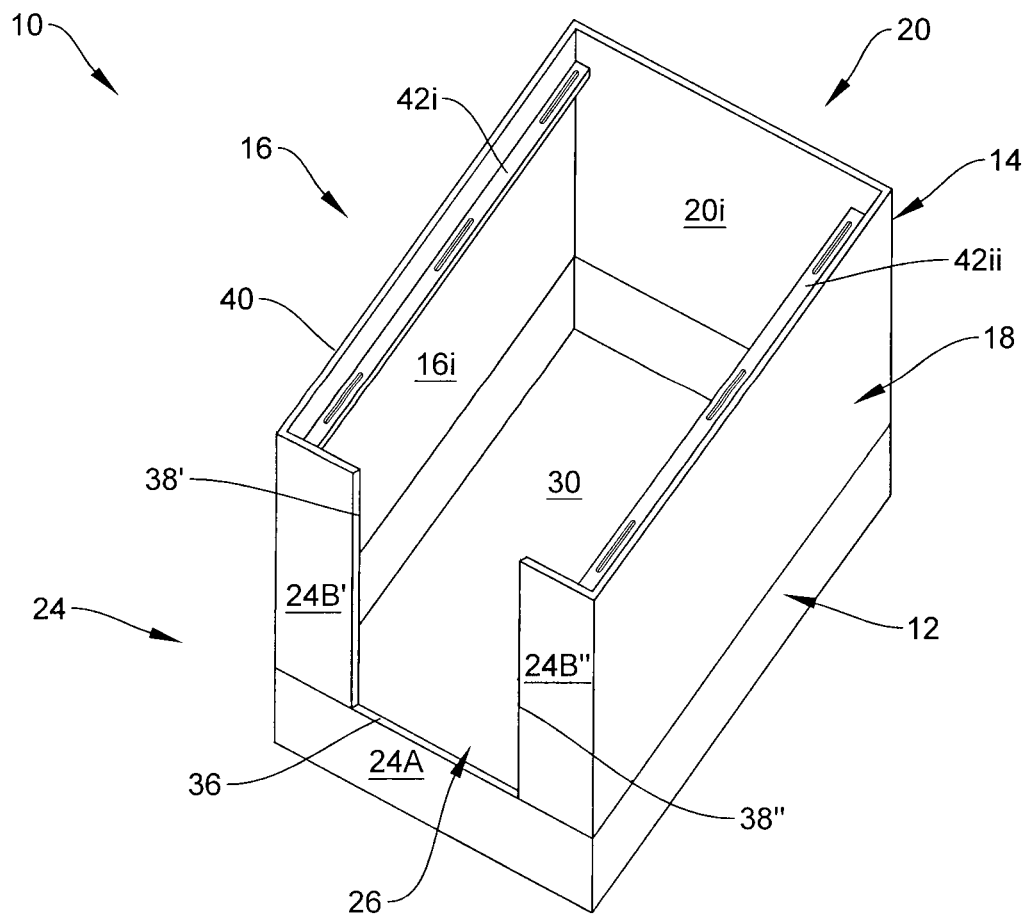
FIG. 2 is a top perspective view of the wetting wall device of FIG. 1.
Figure 4:
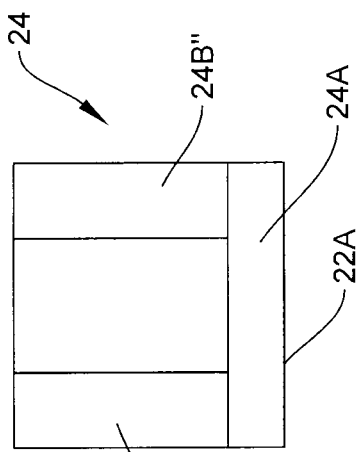
FIG. 4 is a sectional view of the wetting wall device taken along line 4-4 of FIG. 6.
Figure 5:
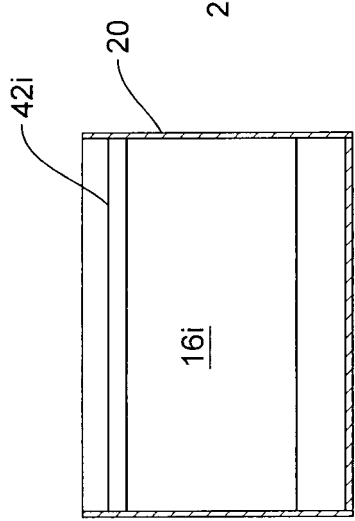
FIG. 5 is a front view of the wetting wall device of FIG. 1.
Figure 3:
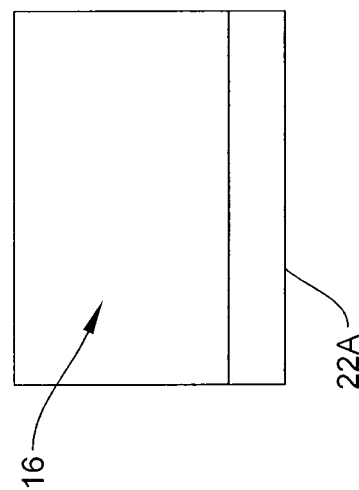
FIG. 3 is a rear view of the wetting wall device of FIG. 1.
Figure 6:
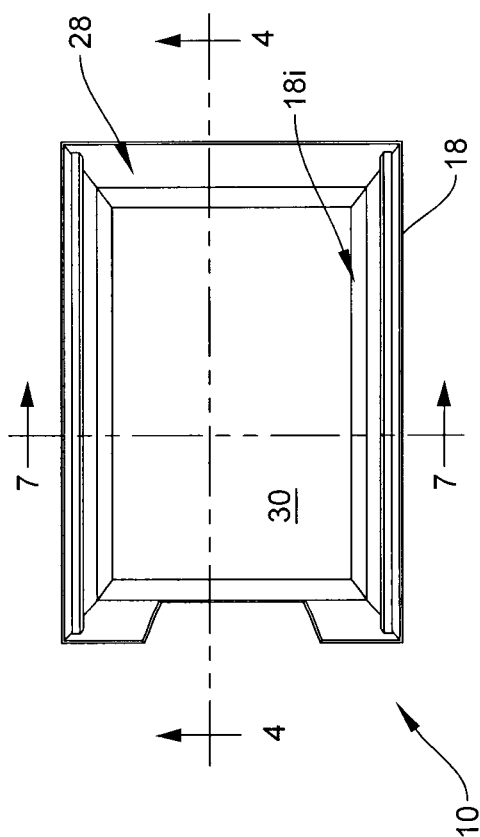
FIG. 6 is a top plan view of the wetting wall device of FIG. 1.
Figure 7:
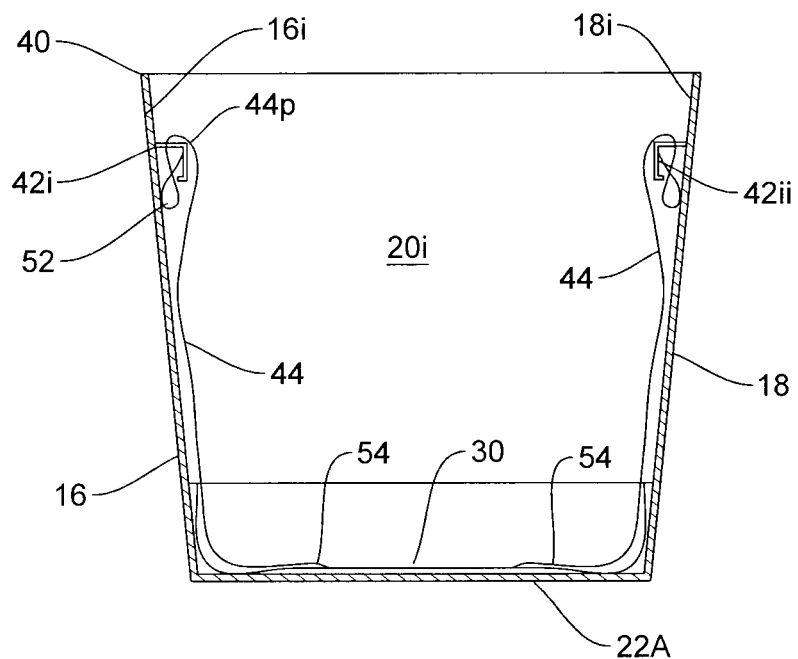
FIG. 7 is a sectional view of the wetting wall device taken along line 7-7 of FIG. 6.

Generally stated and in accordance with an aspect of the present disclosure, there is provided a wetting device for pets comprising at least one vertical wall for vertically mounting a wetting pad thereon. The wetting pad absorbs urine discharged from a pet.

Generally stated and in accordance with an aspect of the present disclosure, there is provided a wetting device for pets comprising an enclosure defining an opening for pets to enter and exit therefrom and comprising at least one vertical inner surface for vertically mounting a wetting pad thereon, wherein the wetting pad absorbs urine discharged from a pet.

FIGS. 1 to 8 show a wetting device 10 for pets such as dogs and more particularly but not exclusively, male dogs.

The wetting device 10 includes a base 12 and a vertical enclosure 14 mounted thereto and upstanding therefrom. In this example, the base 12 and the vertical enclosure have a rectangular configuration, of course other configurations can be contemplated by the skilled artisan within the scope of the present disclosure. For example, the device may be cylindrical, trapezoidal and other desired shapes. The device 10 defines opposite lateral side 16 and 18, a rear side 20, a bottom side 22 and a front side 24 defining an opening 26. The device 10 includes an open top side 28.

Figure 8:
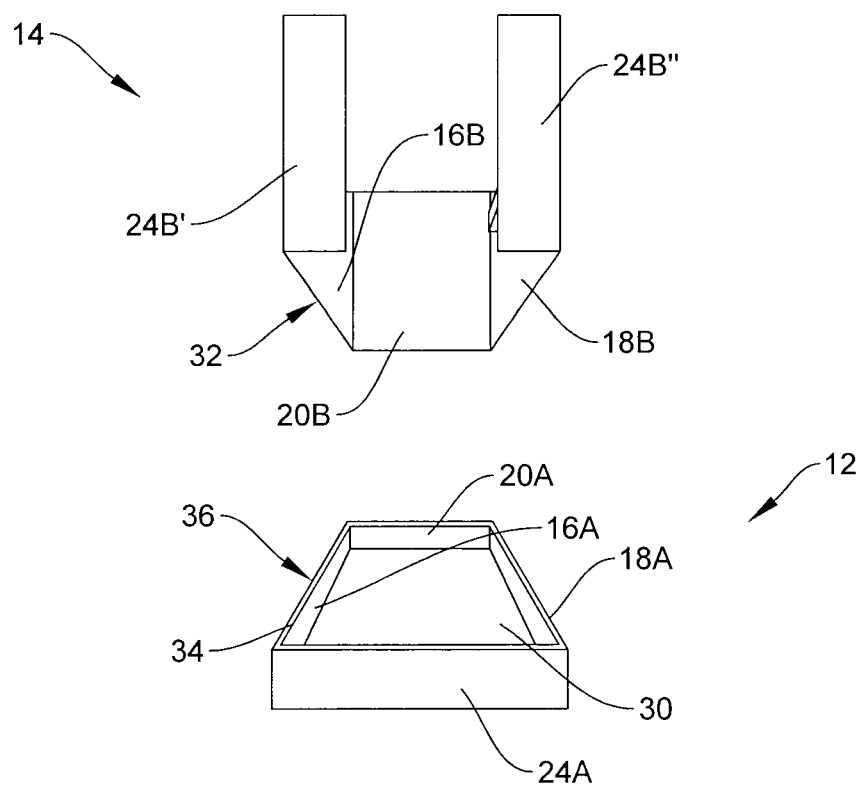
FIG. 8 is a front, perspective exploded view of the wetting wall device of FIG. 1.
Figure 10A:
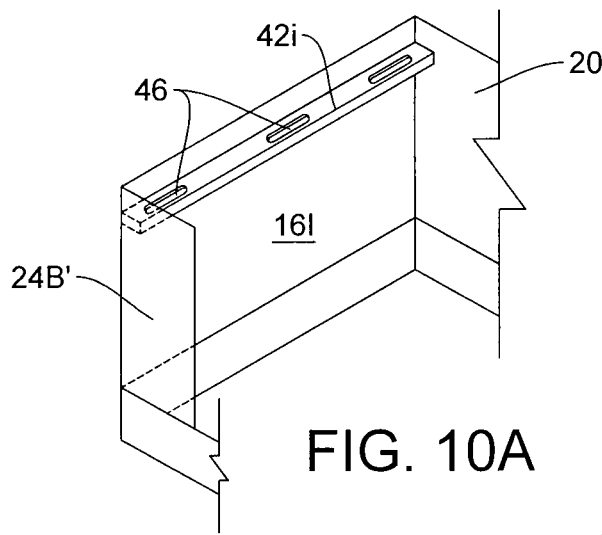
FIG. 10A is a perspective view of an internal panel of the wetting device in accordance with a non-restrictive illustrative embodiment of the present disclosure.
Figure 10B:
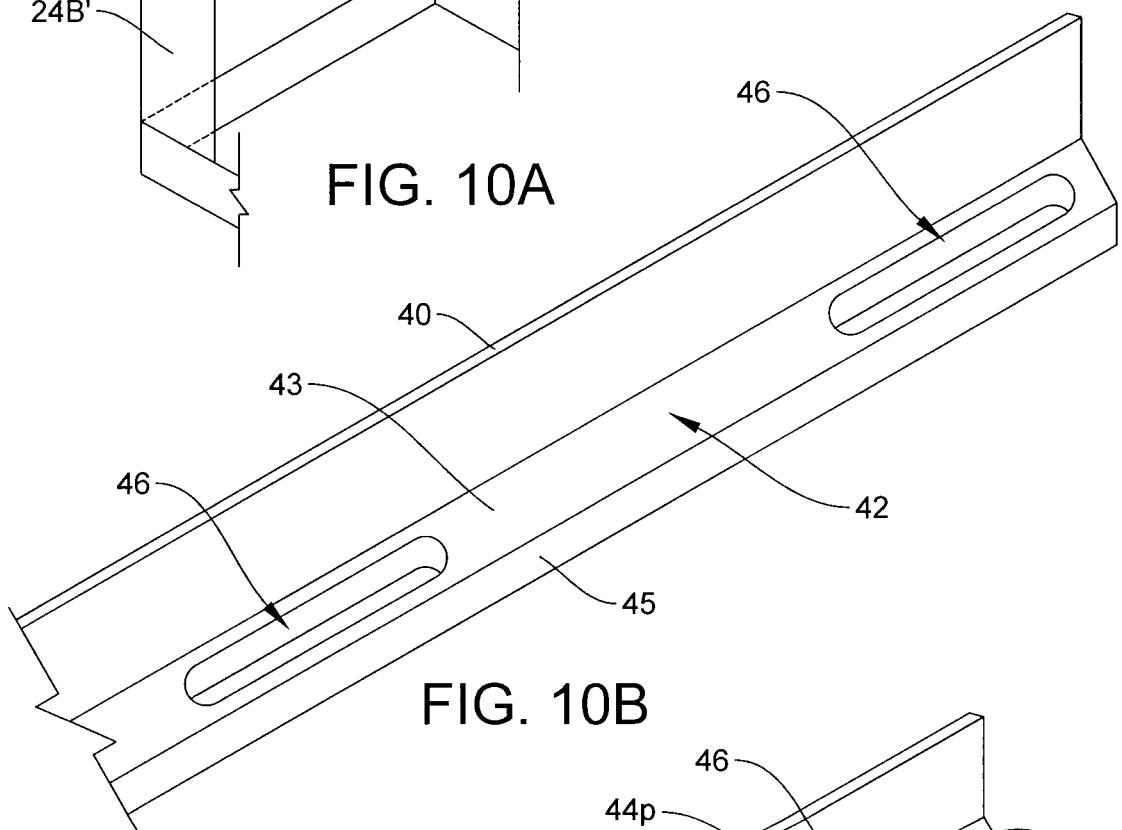
FIG. 10B is an enlarged view of a top portion of the internal panel of FIG. 10A.
Figure 11:
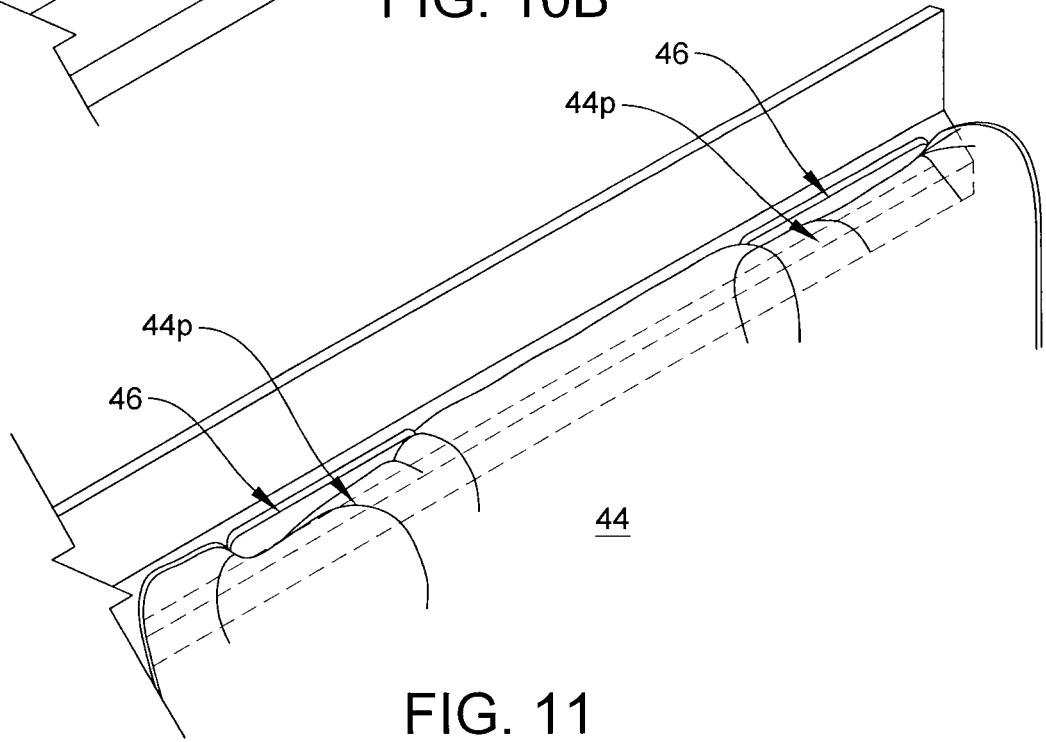
FIG. 11 is an enlarged view of a top portion of the internal panel of the internal panel of FIG. 10A with the wetting pad mounted thereto.

As better shown in FIG. 8 and in a non-restrictive embodiment, the base 12 and vertical enclosure 14 are provided as two separate and connectable parts. In this example, the base 12 is a tray including side walls 16A and 18A, a rear wall 20A, a bottom 22A defining a floor 30 and a front wall 24A. The vertical enclosure 14 includes side walls 16B and 18B, a rear wall 20B, and front spaced apart walls 24B' and 24B" which circumscribes the opening 26. The bottom edges 32 of walls 16B, 18B, 20B, 24B' and 24B" are fitted into a sleeve 34 defined at the top edge 38 of walls 18A, 18A, 20A, and 24A.

The opening 26 is thus delimited by the side edges 38' and 38" of the walls 24B' and 24B", respectively and the top edge 38 of the wall 24A.

The vertical enclosure 14 defines inner wall sides 16$i$, 18$i$ and 20$i$ as well as top edge 40.

With particular reference to FIGS. 2, 7, 10A, 10B and 11, the inner walls 16$i$ and 18$i$ include a respective support member 42$i$ and 42$ii$, respectively, near the top edge 40. The support members 42$i$ and 42$ii$ provide for supporting a respective wetting pad 44 which extends along the length of the inner walls 16$i$ and 18$i$ towards the floor 30 from their top edges 52 to their opposite bottom edges 54. The wetting pads are urine absorbent sheets which can be layered as will be further explained herein. The wetting pads 44 may also receive solid waste thereon as is known in the art. The support members 42$i$ and 42$ii$ include connecting elements 46 in the form of apertures for securely stuffing portions 44$p$ of the wetting pad 44 therein. Each supporting member includes a main longitudinal body 43 mounted to an enclosure inner wall with a front ledge 54 downwardly extending therefrom.

In another embodiment, shown in FIG. 9, the support member 42 mounted an inner wall 16$i$ or 18$ii$ Includes pegs 48 and the wetting pad 44 defines holes 50 near its top edge 52 for receiving the pegs 48 so as to hang therefrom.

In operation, the pet enters the device 10 via opening 26. The pet can spray the vertical wetting pads 44 during urination. The wetting pads 44 absorb the urine and avoid the urine from leaking on the floor 30 and thus wetting the pet. The wall 24 also avoids for any accidental leakage to flow outwardly of the device 10. The wetting pads 44 can be replaced by removing them from the support members 42$i$ and 42$ii$ and adding new pads 44.

In another embodiment, the wetting pad 44 is mounted near the top edge 40 at an inner wall of the vertical enclosure 14 or externally of the vertical enclosure 14 in a roll for being rolled along the length of a given inner wall of the inner enclosure 14 towards the floor 30. The used portion of a wetting pad 44 can be cut and the user can rolling extend a new length of the rolled wetting pad 44 to replace the removed portion. An exemplary version of the foregoing embodiment is discussed further below.

In yet another non-illustrated embodiment, the wetting pad 44 is adhesively mounted to one or more of the inner walls of the vertical enclosure 14. A used wetting pad 44 (or a portion thereof as will be better explained below) can thus be peeled off inner walls and replaced by a new wetting pad 44 or portion thereof.

In an embodiment, the vertical enclosure 14 is made up of separate wall sections assembled on the base 12, at least one of the wall sections includes an integral wetting pad 44. The user can thus selectively replace the sections and add new ones as required.

Figure 12:
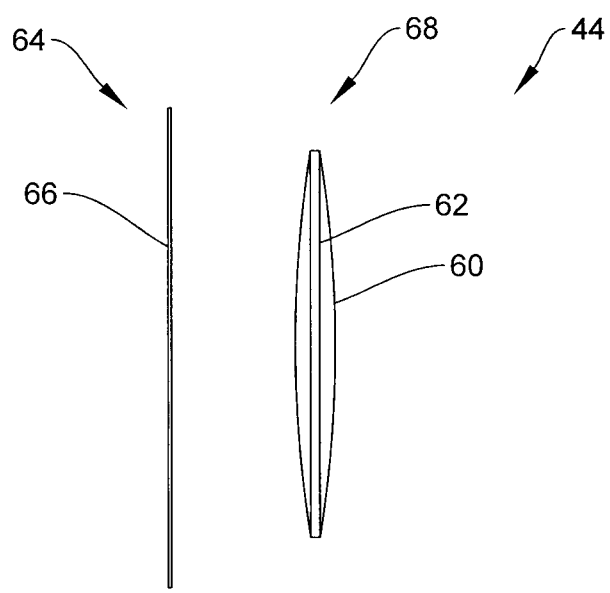
FIG. 12 is a lateral exploded and sectional view of the wetting pad of the wetting wall device in accordance with a non-restrictive illustrative embodiment of the present disclosure.

Turning now to FIG. 12 there is shown a wetting pad 44 including a front sheet 60, an absorbent core 62 and backing sheet 64. The front sheet 60 is liquid pervious and defines wetting wall of the device 10. The backing sheet 64 is liquid impervious thereby acting as a protective barrier. The backing sheet 64 as an outer side 66 which can include an adhesive for being mounted to inner walls of the device 10. The absorbent core 62 absorbs discharge. The front sheet 60 may exhibit good strikethrough and rewet characteristics, permitting urine discharges to rapidly penetrate therethrough to the core 62, but not flow outwardly towards the floor 30. The backing sheet 64 prevents discharges absorbed by the core 62, from escaping.

In an embodiment, the absorbent core 62 is interposed between the front sheet 60 and the backing sheet 64 and the wetting pad 44 is an integral laminated sheet. In another embodiment, the front sheet 60 envelopes the absorbent core 62 and the combined envelope and core 68 overlay the backing sheet 64. In another embodiment, the backing sheet 14 is a separate element and is independently mounted to the inner vertical walls of the device 10. In another embodiment, the inner vertical walls act as a backing sheet.

Figure 13:
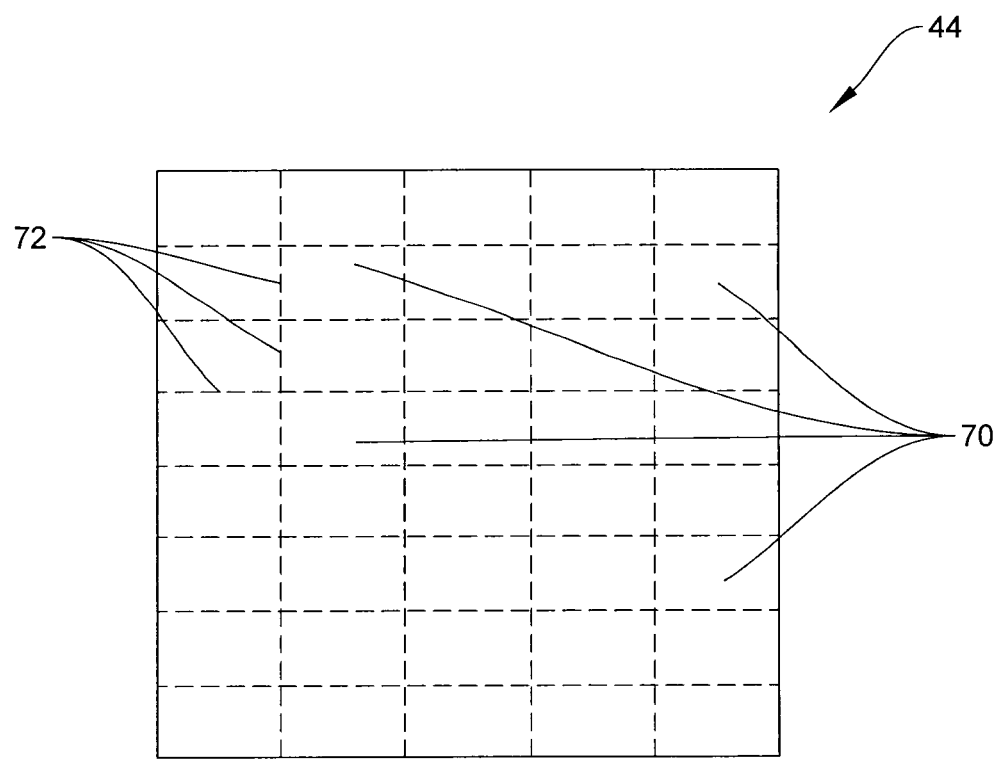
FIG. 13 is a front view of the wetting pad of the wetting wall device in accordance with a non-restrictive illustrative embodiment of the present disclosure.

Turning now to FIG. 13, the wetting pad 44 can be provided in a plurality of pad sections 70 which are connected together via weak tear points 72 for selectively removing used portions (i.e. sections 70) of the pad 44. In another embodiment, the pad sections 70 are separate elements and are independently mountable to and removable from the inner wall of the vertical enclosure 14.

In an embodiment, the device 10 and elements thereof is provided in a form of a kit including Instructions for training pets to use same.

In an embodiment, the user may add toys within the device 10 that can hang from any of the internal walls or even from a top cover (not shown).

In an embodiment, the device 10 may be combined with an external mat (a non-limiting example is discussed further below) placed at the front 24 of the device allowing pets to clean their paws on the mat when exiting via the opening 26.

Figure 14:
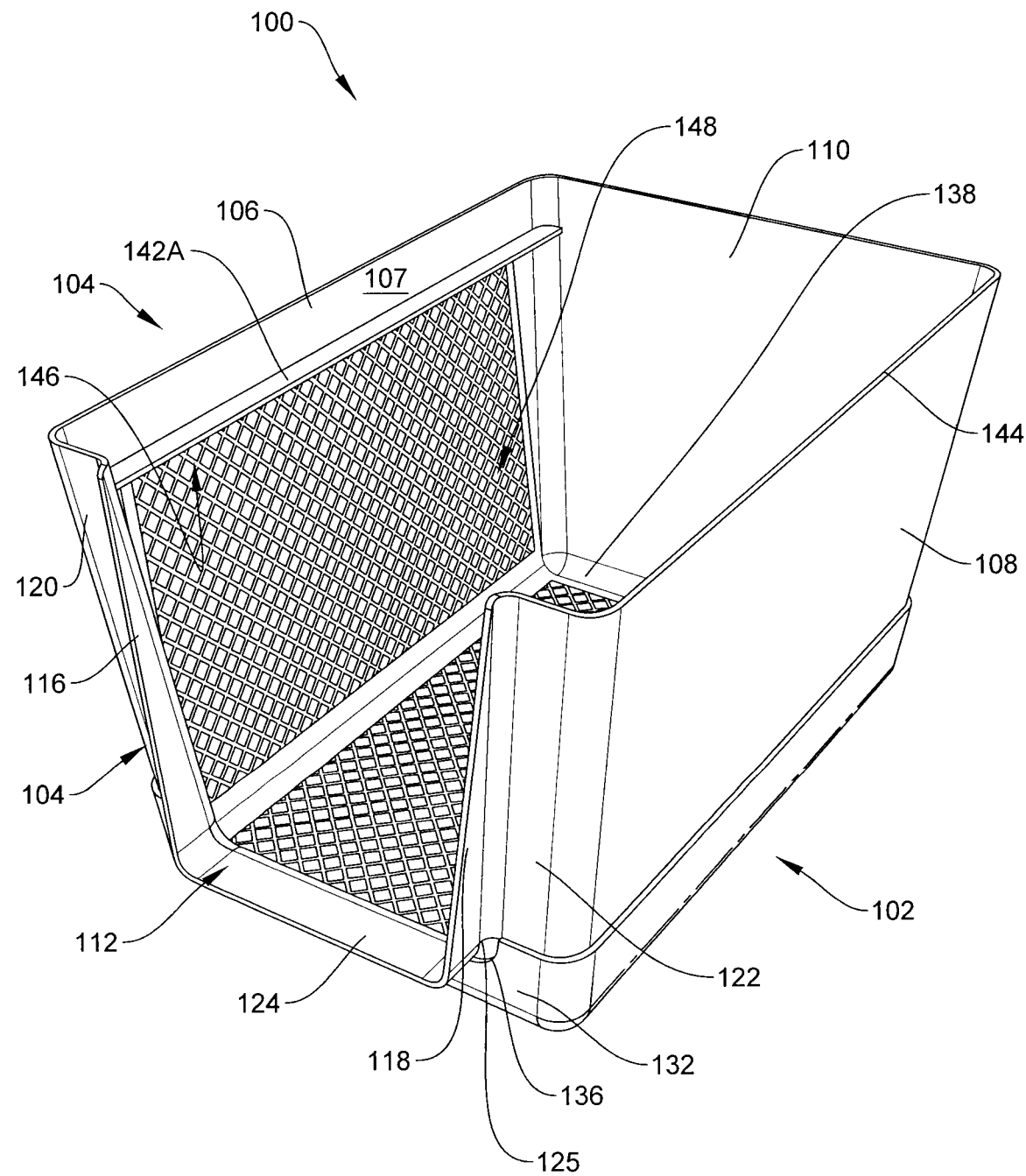
FIG. 14 is a perspective view of the wetting wall device in accordance with another non-restrictive illustrative embodiment of the present disclosure.
Figure 15:
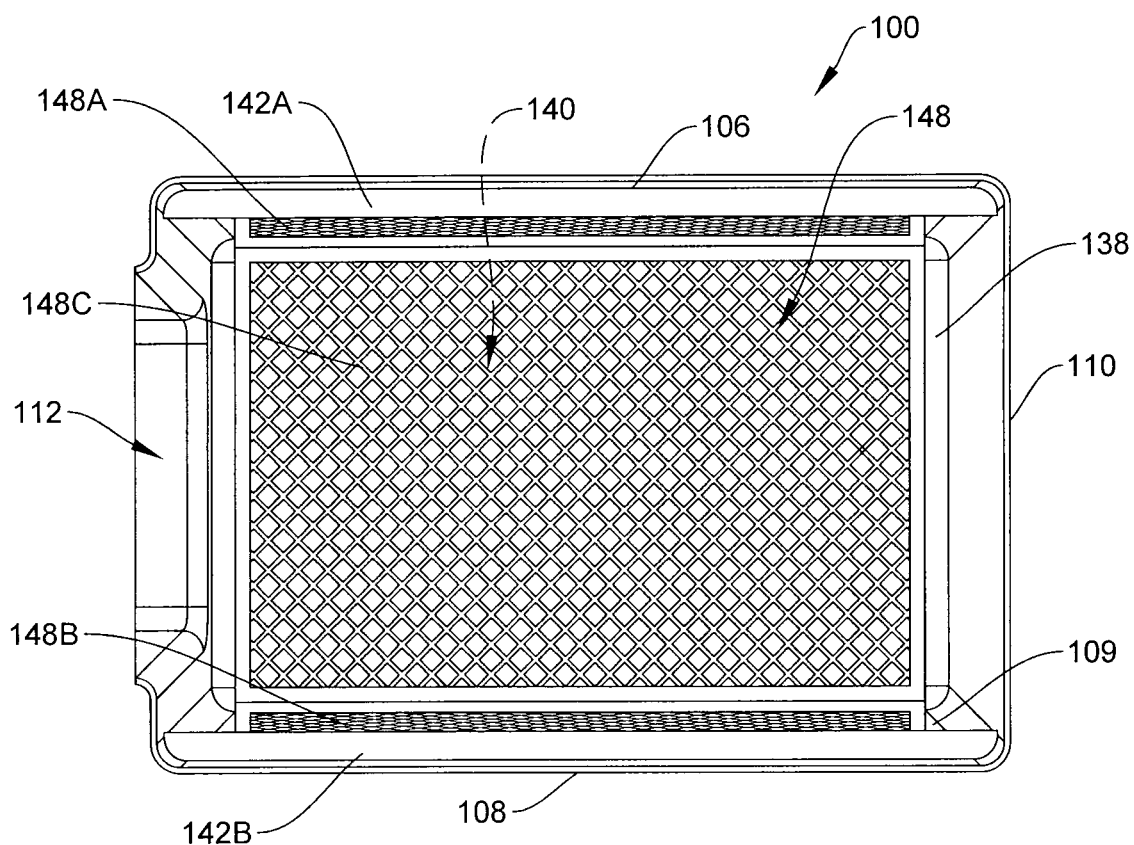
FIG. 15 is a top plan view of the wetting wall device of FIG. 14.
Figure 16:
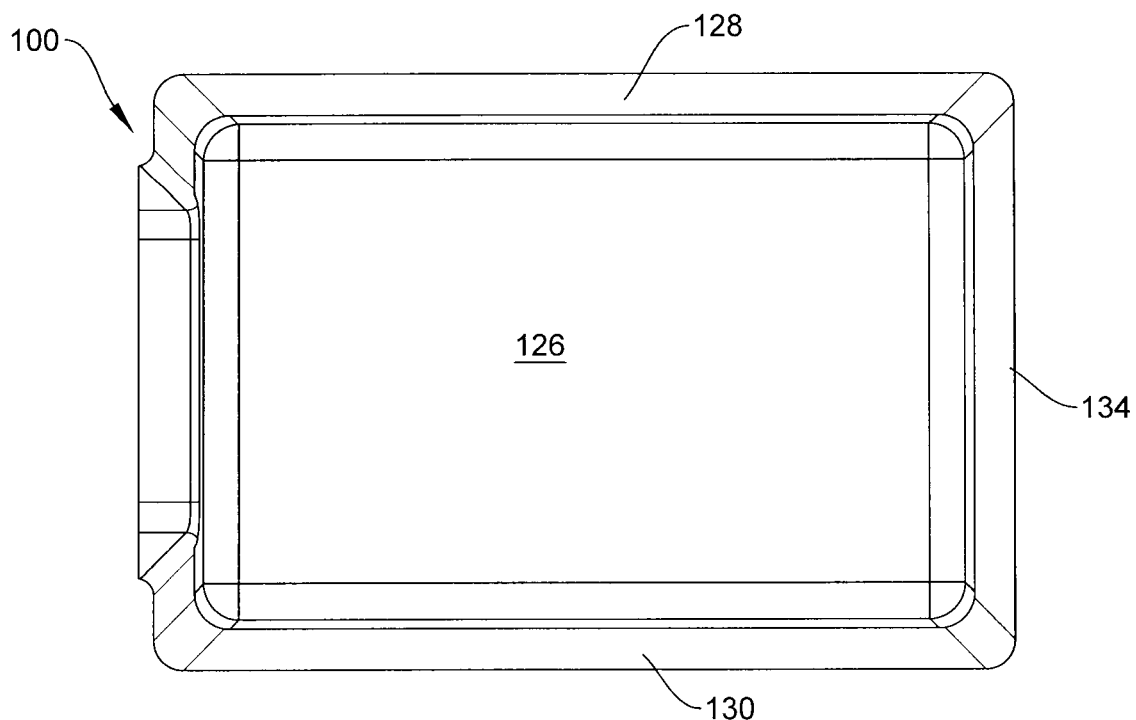
FIG. 16 is a bottom view of the wetting wall device of FIG. 14.

With reference to FIGS. 14 to 16, there is shown a wetting wall device 100 which is similar to device 10.

Device 100 includes a base 102 and a vertical enclosure 104 mounted thereto and upstanding therefrom. The base 102 and the vertical enclosure 104 may be two separate pieces or a single integral piece. In one embodiment, the device 100 includes opposite side walls 106 and 108 and rear wall 110 therebetween. The front side of the device 100 includes an opening 112 defined by a forwardly extending mouth structure 114 having side lip portions 116 and 118 respectively forwardly extending from side wall portions 120 and 122 and having a bottom lip portions 124 extending from a bottom wall portion 125.

The base 102 includes a bottom platform 126, lateral short walls 128 and 130 extending therefrom with front and rear short walls 132 and 134, respectively extending therebetween. The base 102 thus provides a cup like configuration with the front short wall 132 defining a recess 136 which provides a clearance for the bottom lip portion 124.

In an embodiment, the vertical enclosure 104 and the base 102 are two separate pieces. The vertical enclosure 104 includes a bottom wall 138 which rests on the bottom platform 126. In this case the bottom wall 138 defines the floor 140. Moreover, the bottom wall 138 comprises the base of the device 100 and the base 102 comprises a base support which together form a base assembly Side walls 106 and 108 define inner wall sides 107 and 109. Support members, such as longitudinal rails 142A and 142B are positioned on the inner wall sides 107 and 109, respectively, near the top edge 144 of the device 100. The rails 142A and 142B define a respective underside 146.

A wetting pad 148 includes longitudinal ends 150 that have an adhesive strip with peel off film for removal thereof. The adhesive strip at each end is mounted to the underside 146 of each rail 142A and 142B. In this way, the wetting pad 148 defines two side pad sections 148A and 148B and a middle floor pad sections 148C. In another embodiment, the sections 148A, 148B and 148C are three separate pads with pads 148A and 148C being mounted to respective rails 142A and 142B and the pad 148C being positioned on the floor 140 with or without adhesive contact therewith. In yet another embodiment, sections 148A and 148C and form a single pad unit or sections 148B and 148C form a single pad unit.

The floor pad 148C can provide a wetting pad for puppies or female dogs or a pad for solid of waste.

Figure 17:
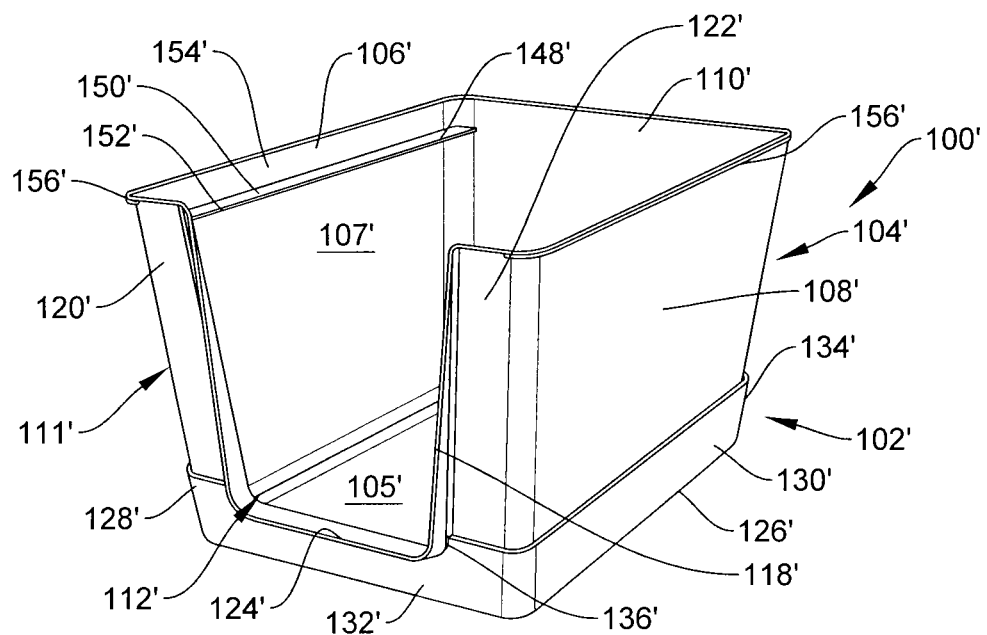
FIG. 17 is a perspective view of a wetting wall device in accordance with a non-restrictive illustrative embodiment of the present disclosure.

With reference to FIG. 17, there is shown a wetting wall device 100' similar to device 100.

Device 100' Includes a base tray 102' for receiving therein a single piece enclosure 104'. The purpose of the base tray 102' is to maintain the enclosure 104' therein. Conveniently, the base tray 102' can be made of a rubberized material for friction non-skid contact with the floor. The enclosure 104' can thus be used without the base tray 102' yet it functions to solidify the enclosure 104' making it safer from tipping over or sliding on the floor. Thus, the device 100' may only comprise the enclosure 104'. Of course, the base tray 102' may also be used separately as a pee pad tray for female dogs or dogs or other pets that do not need to lift their leg.

The enclosure 104' defines a base floor 105' with opposite side walls 106' and 108', a rear wall 110' and a front wall structure 111' upstanding from the base floor 105'. The front wall structure 111' provides an opening 112' defined by a forwardly extending mouth structure 114' having side lip portions 116' and 118' respectively forwardly extending from front wall structure side portions 120' and 122' and having a bottom lip portion 124'.

The base tray 102' includes a bottom platform 126', lateral short walls 128' and 130' extending therefrom with front and rear short walls 132' and 134', respectively extending therebetween. Front wall 132' defines a recess 136' which provides a clearance for the bottom lip portion 124'.

Figure 18:
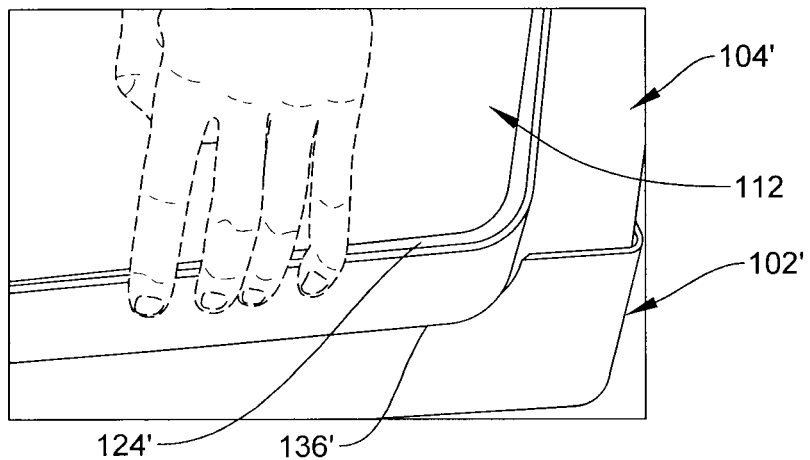
FIG. 18 is a close-up perspective view of the enclosure of the wetting wall device of FIG. 17 being mounted to the base tray of the wetting wall device of FIG. 17.

Turning to FIG. 18, the user optionally places the enclosure 104' within the base tray 102'.

Figure 19:
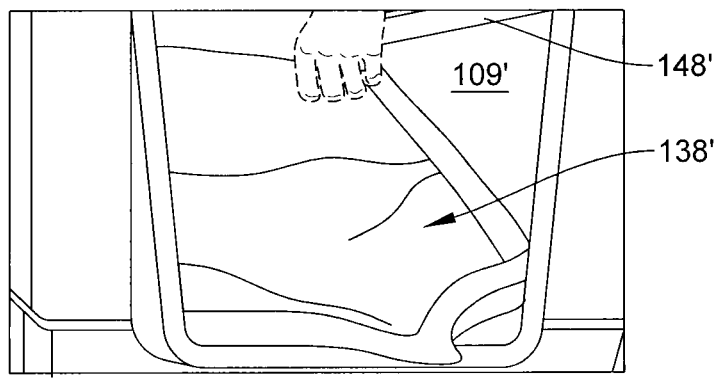
FIG. 19 is a close-up perspective view of a wetting pad being positioned on the floor of the enclosure of the wetting wall device of FIG. 17.
Figure 20:
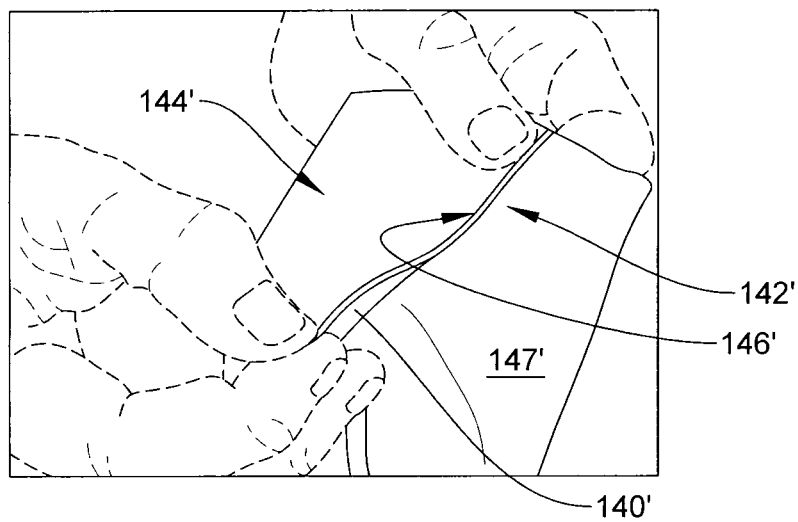
FIG. 20 is a close-up perspective view of a wetting pad having a strip of material removed therefrom reveal an adhesive strip.

In FIG. 19, the user places a pad sheet 138' on the bottom base floor 105'. In FIG. 20, the user removes a liner strip 140' near a top edge 142' of a pad sheet 144' to expose an adhesive strip 146' on the rear face 147' of the pad sheet 144'. In an embodiment, sheets 138' and 144' are the same.

Figure 21:
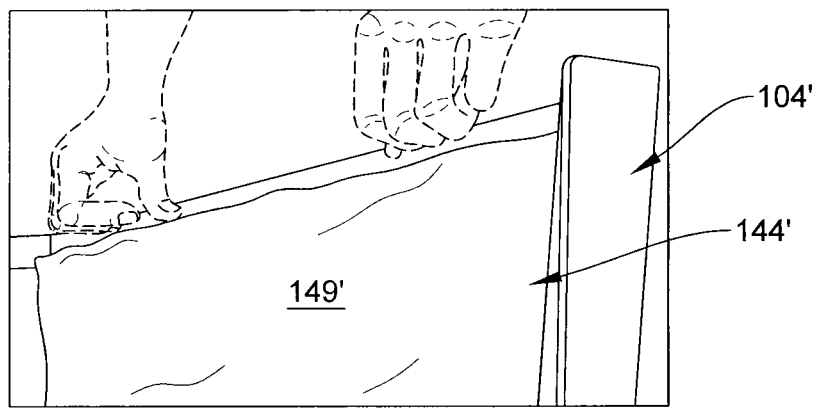
FIG. 21 is a close-up perspective view of the wetting pad of FIG. 20 being mounted to a vertical wall of the enclosure of the wetting wall device of FIG. 17.

Support members 148' are mounted at each inner face 107' and 109' of the lateral walls 106' and 108' respectively. The support members 148' are longitudinal flat rails defining respective upper surfaces 150' and undersurfaces 152' as well as a short vertical wall 156' with snap clip top edge 154' at their lateral ends 158' for being snap clipped onto atop edge 158' of enclosure 104'. Each rail 148' thus runs along the width of a respective inner face 107 and 109 near the top edge 158. In this way, the adhesive strip 146' is adhesively mounted to the upper surface 150' of a rail support member 148' as shown in FIG. 21, providing the pad 144' to be vertically disposed along the inner faces 107 and 109 hanging from the rails 148' and exposing its front face 149' (see FIG. 21) for receiving discharge thereon. The rail 148' thus also acts as a spacer between the inner face 107 and 109 and the pad 144' allowing the pad to be aeriated on its exposed side 149' for receiving discharge and at its rear side 147' Interfacing with an inner face 107 or 109.

Figure 22:
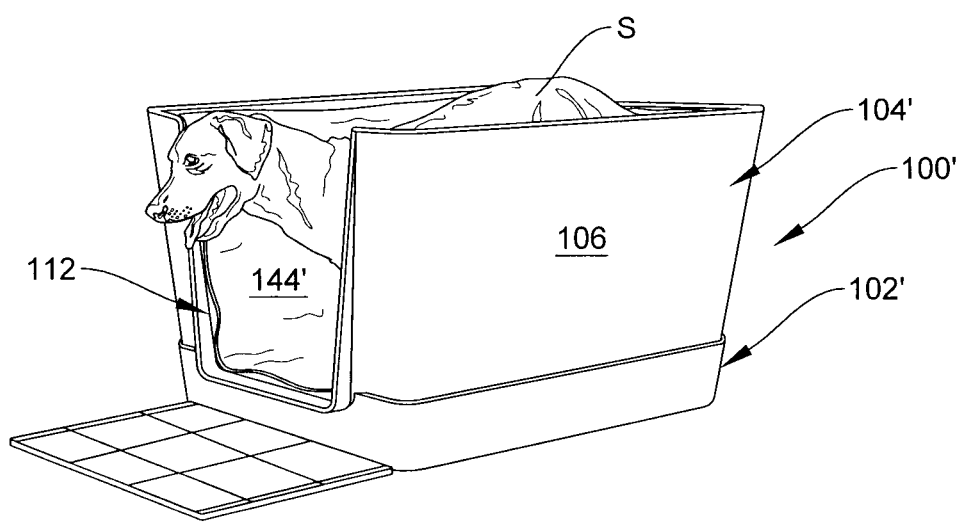
FIG. 22 is a perspective of the wetting wall device of FIG. 17 in use by a pet.

As shown in FIG. 22, a dog S enters enclosure 104' via the opening 112 and instinctively raises their leg to discharge urine onto one of the vertical pads 148' positioned at the side walls 108 or 108. Most dogs may instinctively, look in the direction of the opening 112 which provides them with extra space for their head so they can stretch out as dog S in FIG. 22 and as such, mostly one side (in this case side 108) will be urinated on. A mat 180 is conveniently positioned at the front of device 100' so that the dog may clean its paws as it walks out of the device 100'.

In an embodiment, the pads 144' are provided with snap connectors for being snap locked onto the rails 148'.

FIG. 23 shows a plurality P of absorbent or pee pads 182 used with the devices described herein. The pads of the disclosure may be provided in a variety of shapes, sizes, colours and materials. They may be disposable or reusable washable pads. In an embodiment, the pads are scented in order to attract dogs to use them. In an embodiment, the pads include baking soda to remove the odor of pet discharge. The vertical disposition of the pads allows for urine to be slowly absorbed as it leaks vertically into the pad avoiding the urine from reaching the bottom of the vertical pad near the bottom of the device. In an embodiment, the pads herein include flash gel technology which turns liquid into gel on contact.

In an embodiment, the exposed side (such as side 149' of the vertical pads 144') comprise non-woven fabric, the core (such as core 62 for example) comprises fluff paper and superabsorbent polymer sandwiched between tissue paper laminate and the rear side (such as side 147' of vertical pads 144') comprises biodegradable polyethylene film.

With reference to FIGS. 24 to 27, there is shown a wetting wall device 200 for pets. Device 200 is similar to devices 10, 100, and 100'. Device 200 is a collapsible or foldable device. Device 200 comprises a base floor 202 and an enclosure 204 vertically extending therefrom and comprising side walls 206 and 208, a rear wall 210 and a front wall 212. The front wall 212 has a rectangular u-shaped structure comprising a bottom short wall portion 214 and side narrow wall portions 216A and 216B and defining an opening 218 therebetween.

Walls 206, 208, 210 and 212 are pivotally connected to the base floor 202 at edges 220A, 220B, 220C and 220D thereof respectively. The pivot connection is provided by a variety of suitable elements such as a material, hinges, a pivot rod, a joint and the like at edges 220A, 220B, 220C and 220D.

In an embodiment, the enclosure 204 is secured at the upstanding position as shown in FIG. 24 by locking adjacent walls at corners 222A, 222B, 222C and 222D. The foregoing is provided by snaps, buttons, hooks or slots at each corner for receiving locks. As such, wall 206 is releasably locked with walls 210 and 212 at corners 222C and 222A respectively and wall 208 is releasably locked with walls 210 and 212 at corners 222D and 222B respectively. In an embodiment, the enclosure 204 is secured at the upstanding position shown in FIG. 24 by releasably locking walls 206, 208, 210 and 212 to base floor 202 at edges 220A, 220B, 220C and 220D respectively.

The device 200 is placed into the folded or collapsed position of FIG. 27 by folding down walls 206, 208, 210 and 212 towards the base floor as shown in FIGS. 25 and 26. When desired, the walls 206, 208, 210 and 212 are unfolded or moved upwardly away from the base floor 202 towards the vertical upstanding position as shown in FIG. 24.

In another embodiment, the device includes only a vertical enclosure with bottom and top openings and a front opening. The bottom edges and the support surface underneath forming the base of the device.

In an embodiment, the top of the device is closed and can be provided with an openable enclosure or an enclosure with windows or other openings.

Figure 28:
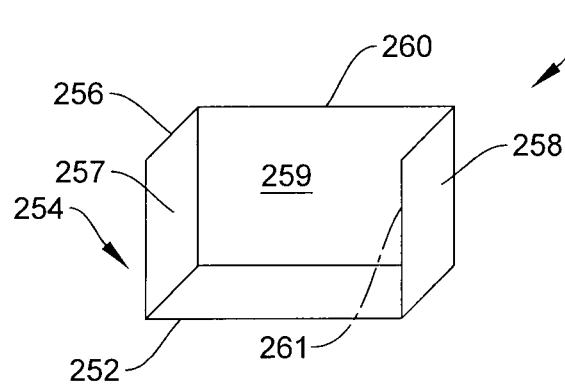
FIG. 28 is a perspective view of a plurality of wetting pads in accordance with a non-limiting illustrative embodiment of the present disclosure.

Other non-restrictive illustrative embodiments of wetting wall devices will be provided with reference to FIGS. 28 to 35 to further exemplify the disclosure and by no means limit the scope thereof, FIG. 28 shows a device 250 comprising a base floor 252 and an enclosure 254 vertically upstanding therefrom and comprising spaced apart walls 256 and 258 with wall 260 positioned therebetween and defining an open side 282. Walls 256, 258 and 260 provide respective inner surfaces 257, 259 and 261 for receiving thereon a wetting absorbent pad. The pet may step on the floor base 252 for spraying one of the walls surfaces 257, 259 and 261. The floor base 252 can also be provided with a pad for urine and/or solid waste.

Figure 29:
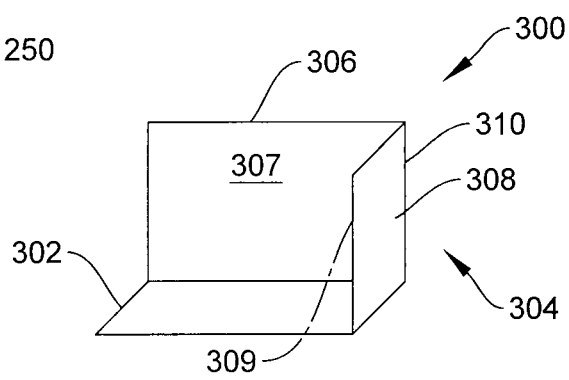
FIG. 29 is a perspective view of a plurality of wetting pads in accordance with another non-limiting illustrative embodiment of the present disclosure.

FIG. 29 shows a device 300 comprising a base floor 302 and a partial enclosure 304 upstanding therefrom and comprising walls 306 and 308 defining a corner 310 therebetween. Walls 306 and 308 define respective inner faces 307 and 309 for vertically mounting wetting pads thereon as provided herein. Thus, the pet when standing on floor 302 may spray the inner faces 307 or 309. One again the pads herein can also be mounted provided on the floor 302.

Figure 30:
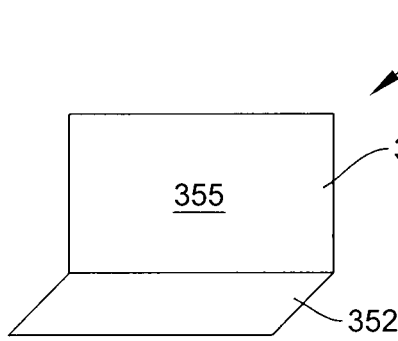
FIG. 30 is a perspective view of a plurality of wetting pads in accordance with a further non-limiting illustrative embodiment of the present disclosure.

FIG. 30 shows a device 350 comprising a base floor 352 and a vertical wall 354 defining an inner face 355 for receiving the wetting pads thereon as provided herein. The pet stands on floor 352 when spraying face 355 which includes the pads. The base floor 352 may optionally be provided with absorbent pads.

Figure 31:
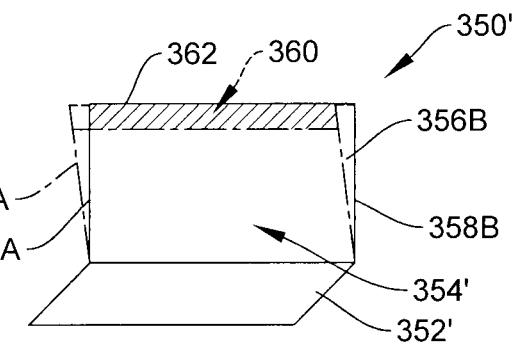
FIG. 31 is a perspective view of a plurality of wetting pads in accordance with yet another non-limiting illustrative embodiment of the present disclosure.

FIG. 31 shows a device 350' that is similar to device 350 with the exception that wall 354' thereof has side guard walls 356A and 358B mounted at its lateral edges 358A and 358B. A top guard wall 380 is also mounted to the top edge 362 of the wall 354'. The guard walls 356A, 356B and 360 catch pet discharge sprayed beyond the inner surface 355' of the vertical wall 352'. The pet steps on base floor 352' when wetting the vertical wall 354'.

Figure 32:
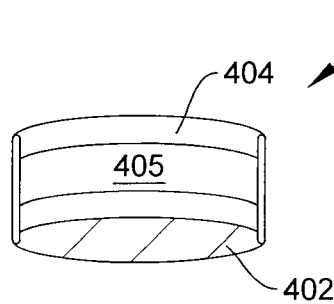
FIG. 32 is a perspective view of a plurality of wetting pads in accordance with yet a further non-limiting illustrative embodiment of the present disclosure.

FIG. 32 shows a device 400 that comprises a cylindrical configuration. Device 400 comprises a circular base floor 402 and a curved vertical well 404 vertically extending therefrom and defining an inner surface 405 for receiving vertically disposed wetting pads as providing herein. The floor 402 may also receive absorbent pads for urine or solid waste.

Figure 33:
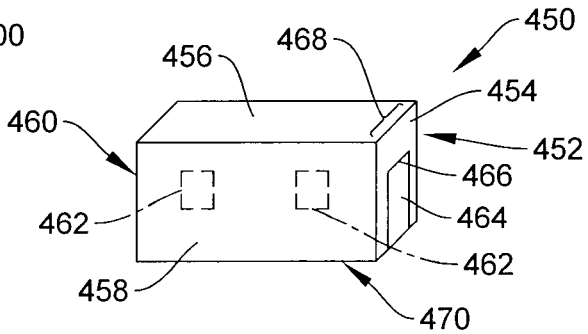
FIG. 33 is a perspective view of a plurality of wetting pads in accordance with still another non-limiting illustrative embodiment of the present disclosure.

FIG. 33 shows a device 450 comprising a rectangular enclosure 452 comprising front wall 454, top wall 456, lateral walls 456 and rear wall 460. Lateral walls 458 define inner faces (not shown) for receiving wetting pads thereon. In an embodiment, one of the lateral walls 458 receives wetting pads on its inner side, while the other wall 458 includes windows 462. The front wall 454 includes an access door 464 pivotally mounted at its top edge 466 to the wall 454. The top wall 456 includes a handle 468 for being lifted or removed by the user. The enclosure may be positioned on the floor or a base floor 470 or base tray.

Figure 34:
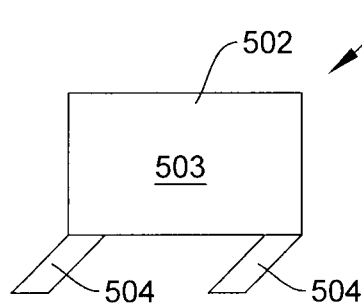
FIG. 34 is a perspective view of a plurality of wetting pads in accordance with still a further non-limiting illustrative embodiment of the present disclosure.

FIG. 34 shows a device 500 comprising a vertical wall 502 upstanding from a base in the form of a pair of support feet 504. The vertical wall 502 defines a surface face 503 for receiving the wetting pads provided herein. The pet stands near the wall 502 to spray the fact 503 with the pads. The vertical wall 502 defines an opposite surface (not shown) which may also receive the vertical wetting pads herein.

Figure 35:
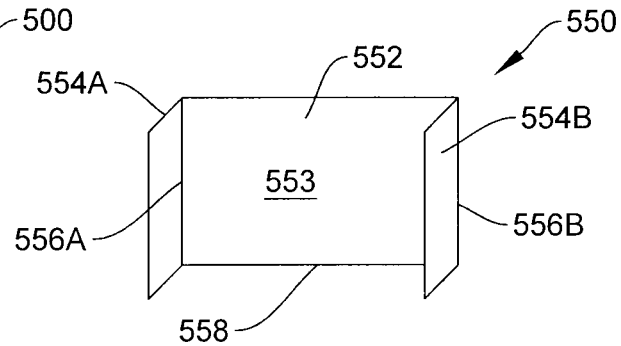
FIG. 35 is a perspective view of a plurality of wetting pads in accordance with still yet another non-limiting illustrative embodiment of the present disclosure.

FIG. 35 shows a device 550 comprising a vertical wall 552 having guard walls 554A and 554B at each lateral edge 556A and 556B thereof forwardly protruding therefrom. The configuration of walls 552, 554A and 554B provide the vertical wall 552 to vertically stand on the bottom edge 558. The vertical wall 552 defines an inner face 553 for receiving the wetting pads of the present disclosure.

In an embodiment, the device of the present disclosure comprises a vertical wall for being mounted to a surface and for providing wetting pads to be vertically disposed thereon on its exposed face.

Figure 36:
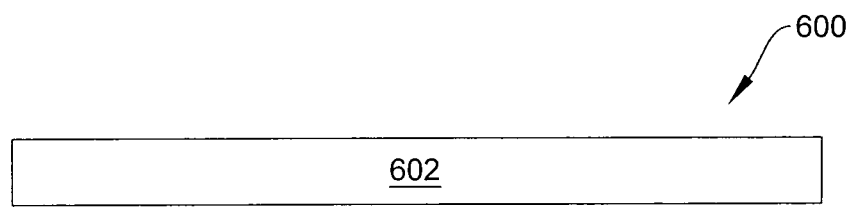
FIG. 36 is a front elevation view of a wetting pad mounting element in accordance with a non-limiting illustrative embodiment of the present disclosure.

Turning now to FIG. 36, there is shown a wetting pad mounting element 600 for being mounted on an inner or exposed surface a vertical wetting wall of the devices herein. The mounting element 600 comprises a mounting surface 602 for connecting a portion of the wetting pads of the disclosure thereon. In an embodiment, the mounting surface 802 comprises an adhesive. In an embodiment, the mounting surface 602 comprises fasteners. In an embodiment, the fasteners are selected from hook and loop fasteners.

Figure 37:
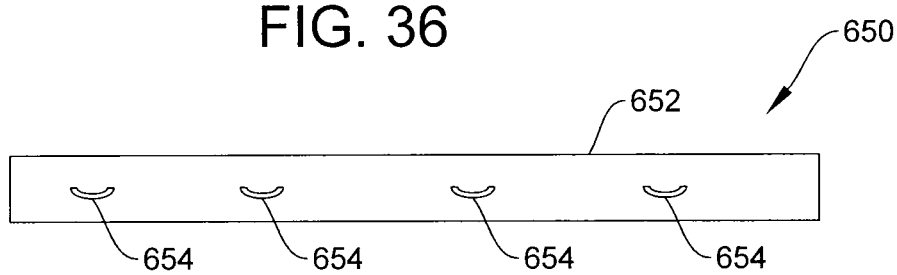
FIG. 37 is a front elevation view of a wetting pad mounting element in accordance with another non-limiting illustrative embodiment of the present disclosure.

FIG. 37 shows a wetting pad mounting element 650 for being mounted on an inner or exposed surface a vertical wetting wall of the devices herein. The mounting element 650 comprises an elongate strip 652 with loops 654 for receiving hooks from the wetting pads. In an embodiment, the wetting pads comprise clips for being clipped on the loops 654. In an embodiment, the wetting pads comprise snap fit elements for being snapped onto loops 654.

Figure 38:
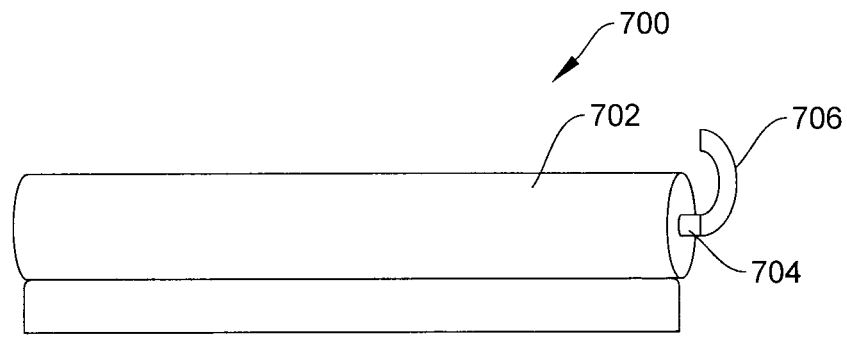
FIG. 38 is a front elevation view of wetting pad roll mounted to roller in accordance with a non-limiting illustrative embodiment of the present disclosure.

FIG. 38 shows a roll 700 of a wetting pad sheet 702 mounted to a roller 704 with a side handle 706 for selectively rolling the roll 700 to dispense a length of sheet 702 that is removed by cutting off or via weak lines when used. The roll 700 is mounted to an inner side of the vertical wall of the devices herein and is lockable in position to not be rolled when not wanted.

Figure 39:
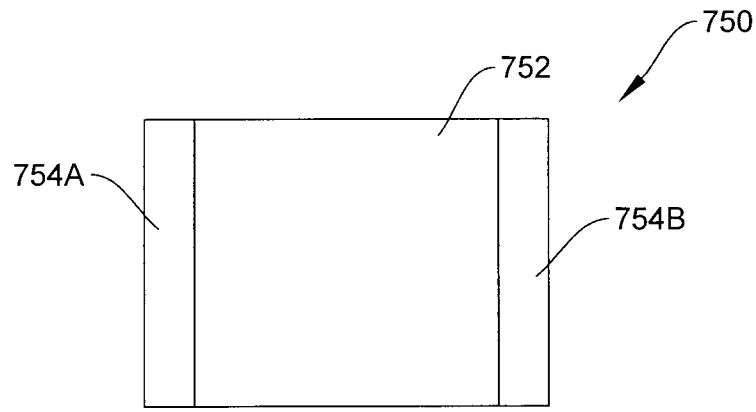
FIG. 39 is a front elevation view of wetting pad mounted to wetting pad mounting element in accordance with a further non-limiting illustrative embodiment of the present disclosure.

FIG. 39 shows a wetting pad mounting device 750 for mounting a wetting pad sheet 752 thereto. The mounting device 750 comprises slot members 754A and 754B mounted to the inner face of the vertical wall of the devices herein for receiving the lateral edges of the wetting pads sheet. In an embodiment, the members 754A and 7546 are clip board style clipping elements. In an embodiment, only one element 754A and 7545 is provided on an inner surface and is positioned horizontally on the inner surface of the vertical wetting wall.

The wetting wall devices described herein, and the components thereof can be provided in a variety of suitable materials, shapes, sizes and configurations within the context of the present disclosure.

The various features described herein can be combined in a variety of ways within the context of the present disclosure so as to provide still other embodiments. As such, the embodiments are not mutually exclusive. Moreover, the embodiments discussed herein need not include all of the features and elements illustrated and/or described and thus partial combinations of features can also be contemplated. Furthermore, embodiments with less features than those described can also be contemplated. It is to be understood that the present disclosure is not limited in its application to the details of construction and parts illustrated in the accompanying drawings and described hereinabove. The disclosure is capable of other embodiments and of being practiced in various ways. It is also to be understood that the phraseology or terminology used herein is for the purpose of description and not limitation. Hence, although the present disclosure has been provided hereinabove by way of non-restrictive illustrative embodiments thereof, it can be modified, without departing from the scope, spirit and nature thereof and of the appended claims.

What is claimed is:

1. A wetting device for pets comprising:
   a base defining a floor and a front bottom wall upwardly extending from the floor;
   an enclosure upstanding from the base, the enclosure comprising opposite lateral vertical walls upwardly extending from the base from a bottom end thereof towards a top free end thereof, a rear wall adjoining the vertical walls and being contiguous therewith and upwardly extending from the base from a bottom end thereof towards a top free end thereof,
   wherein the enclosure and the front bottom wall define a front opening for allowing the pet to enter and exit the enclosure;
   wherein the opposite lateral vertical walls comprise respective inner faces defining respective widths thereof;
   at least one of the lateral vertical walls comprising a rail comprising a horizontal longitudinal configuration defining an upper surface and an opposite undersurface, the rail extending from the inner face of the at least one of the lateral vertical walls, running along the width of the inner face and being positioned at least near the top free end of the at least one of the lateral vertical walls, the rail providing for vertically mounting a wetting pad thereto providing for the wetting pad to downwardly and vertically hang therefrom towards the floor, the rail acting as a spacer between the wetting pad and the inner face of the at least one lateral vertical wall along the width of the inner face allowing for aeration therebetween,
   wherein the wetting pad absorbs urine discharged from a pet.

2. A wetting device for pets according to claim 1, wherein the wetting pad comprises an adhesive substance on a rear side thereof.

3. A wetting device for pets according to claim 2, wherein the wetting pad comprises a removable strip of material covering the adhesive substance.

4. A wetting device for pets according to claim 1, wherein the wetting pad is adhesively mountable to either one of the upper surface and the opposite undersurface of the rail.

5. A wetting device for pets according to claim 1, wherein the rail defines apertures for stuffing portions of the vertical wetting pad therein.

6. A wetting device for pets according to claim 1, wherein the wetting pads comprise wetting pad mounting elements for being mounted on the rail, the wetting pad mounting elements being selected from the group consisting of clips and snap fit elements.

7. A wetting device for pets according to claim 1, wherein the rail comprises hook and loop elements.

8. A wetting device for pets according to claim 1, wherein the wetting pad comprises a backing sheet and an absorbent layer overlaying backing sheet.

9. A wetting device for pets according to claim 8, wherein the backing sheet is liquid impervious.

10. A wetting device for pets according to claim 8, wherein the absorbent layer comprises a top sheet overlaying an absorbent core.

11. A wetting device for pets according to claim 8, wherein the backing sheet defines an outer side comprising an adhesive.

12. A wetting device for pets according to claim 1, wherein the at least one lateral vertical wall comprises a backing sheet material mounted to the inner face thereof.

13. A wetting device for pets according to claim 1, wherein the wetting pad comprises a plurality of pad sections thereof.

14. A wetting device for pets according to claim 13, wherein the pad sections are separate from each other.

15. A wetting device for pets according to claim 13, wherein the plurality of pad sections are connected to each other via weak tear points for selective removal thereof.

16. A wetting device for pets according to claim 1, wherein the base is selected from the group consisting of a bottom edge of the enclosure, a bottom wall of the enclosure, a separate base body on which the enclosure is mounted to, a tray.

* * * * *